United States Patent
Drahm et al.

(10) Patent No.: US 6,484,591 B2
(45) Date of Patent: Nov. 26, 2002

(54) MASS FLOW RATE/DENSITY SENSOR WITH A SINGLE CURVED MEASURING TUBE

(76) Inventors: Wolfgang Drahm, Am Hochrainacker 82, D-85435 Erding (DE); Alfred Rieder, Fürstenstrasse 10, D-84030 Ergolding (DE); Alfred Wenger, Schulstrasse 170, CH-8413 Neftenbach (CH); Rainer Lorenz, Basler Strasse 69, D-79540 Lörrach (DE)

( * ) Notice: Subject to any disclaimer, the term of this patent is extended or adjusted under 35 U.S.C. 154(b) by 15 days.

(21) Appl. No.: 09/829,890

(22) Filed: Apr. 10, 2001

(65) Prior Publication Data

US 2001/0035055 A1 Nov. 1, 2001

Related U.S. Application Data

(60) Provisional application No. 60/201,893, filed on May 4, 2000.

(51) Int. Cl.[7] .............................................. G01F 1/84
(52) U.S. Cl. .............................................. 73/861.355
(58) Field of Search .................. 73/861.356, 861.357, 73/861.355

(56) References Cited

U.S. PATENT DOCUMENTS

| | | | |
|---|---|---|---|
| 5,549,009 A | 8/1996 | Zaschel | 73/861.355 |
| 5,602,344 A | 2/1997 | Lew et al. | 73/861.356 |
| 6,223,605 B1 * | 5/2001 | Koudal et al. | 73/861.357 |
| 6,360,614 B1 * | 3/2002 | Drahm et al. | 73/861.357 |

FOREIGN PATENT DOCUMENTS

| | | |
|---|---|---|
| EP | 0 473 919 | 7/1991 |
| EP | 0 871 017 | 4/1997 |
| WO | WO 99/51946 | 10/1999 |

* cited by examiner

Primary Examiner—Harshad Patel
(74) Attorney, Agent, or Firm—Bose McKinney & Evans LLP

(57) ABSTRACT

A single V-shaped tube (1) is bent in a plane and has an inlet section (11), an outlet section (12), an inlet bend (13), an outlet bend (14); a vertex bend (15) and a respective tube section (16, 17) between the inlet bend and the outlet bend. The distance between the vertex of the vertex bend and the inlet/outlet axis can be great. Two clamping bodies (2, 3) are clamped onto the tube sections defining a tube section. Flat bodies (31, 32) are fixed onto the clamping bodies (2, 3). Fixed to the flat bodies is an opposed-action body (41) which extends along the axis of symmetry (I—I) up to the vertex bend, where it supports a first portion of an exciter assembly (50) or a seismic exciter (50') which excites the tube section in a third mode of vibration at an associated natural frequency $f_3$. A sensor support (61) and a sensor support (62) are fixed to the flat body (31). A velocity or displacement sensor (71, 72) is fixed to the tube section and the sensor supports. Inlet section and outlet section are held by a supporting frame (35) to which a housing (8) is fixed.

16 Claims, 4 Drawing Sheets

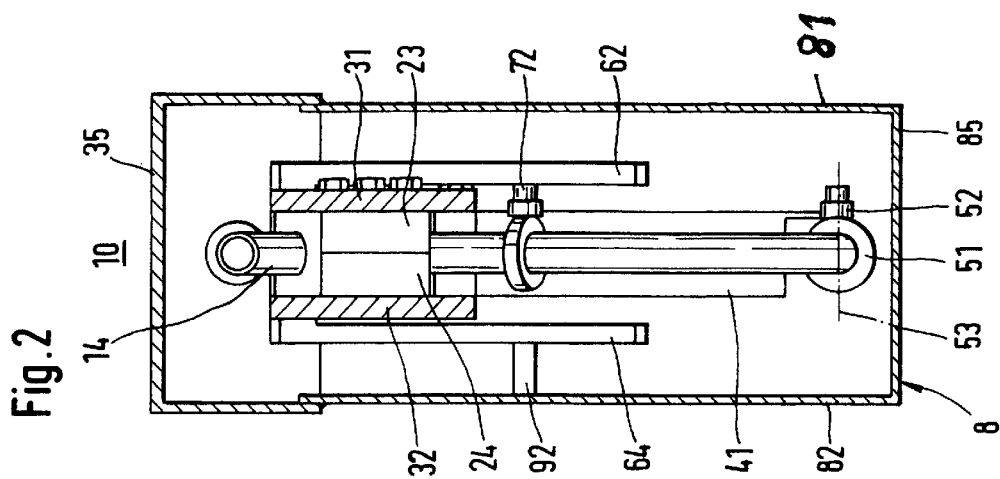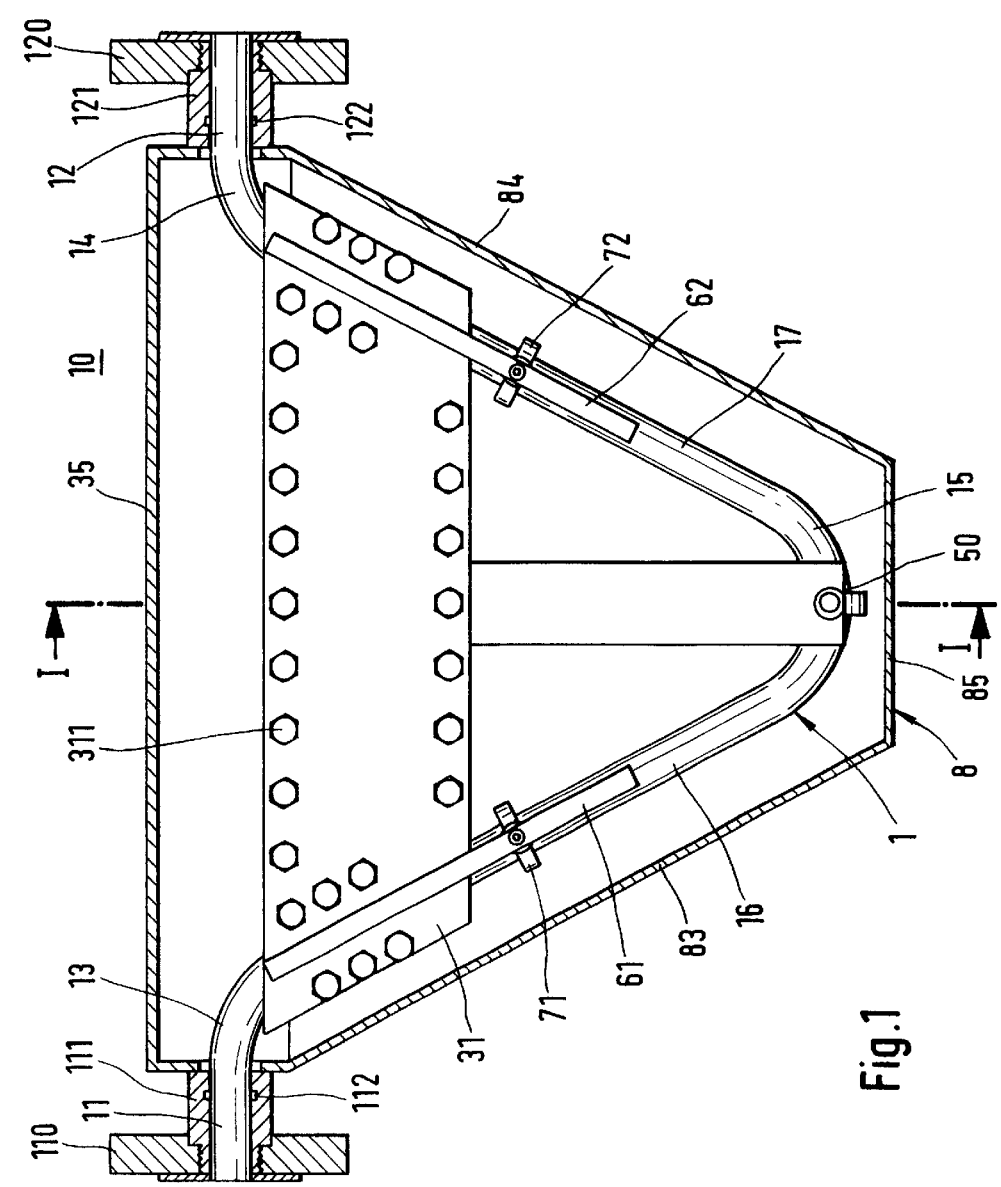

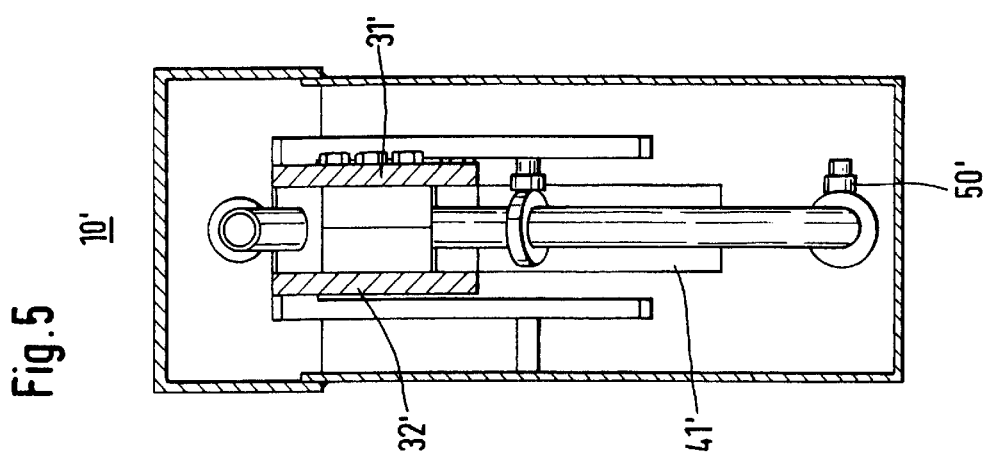
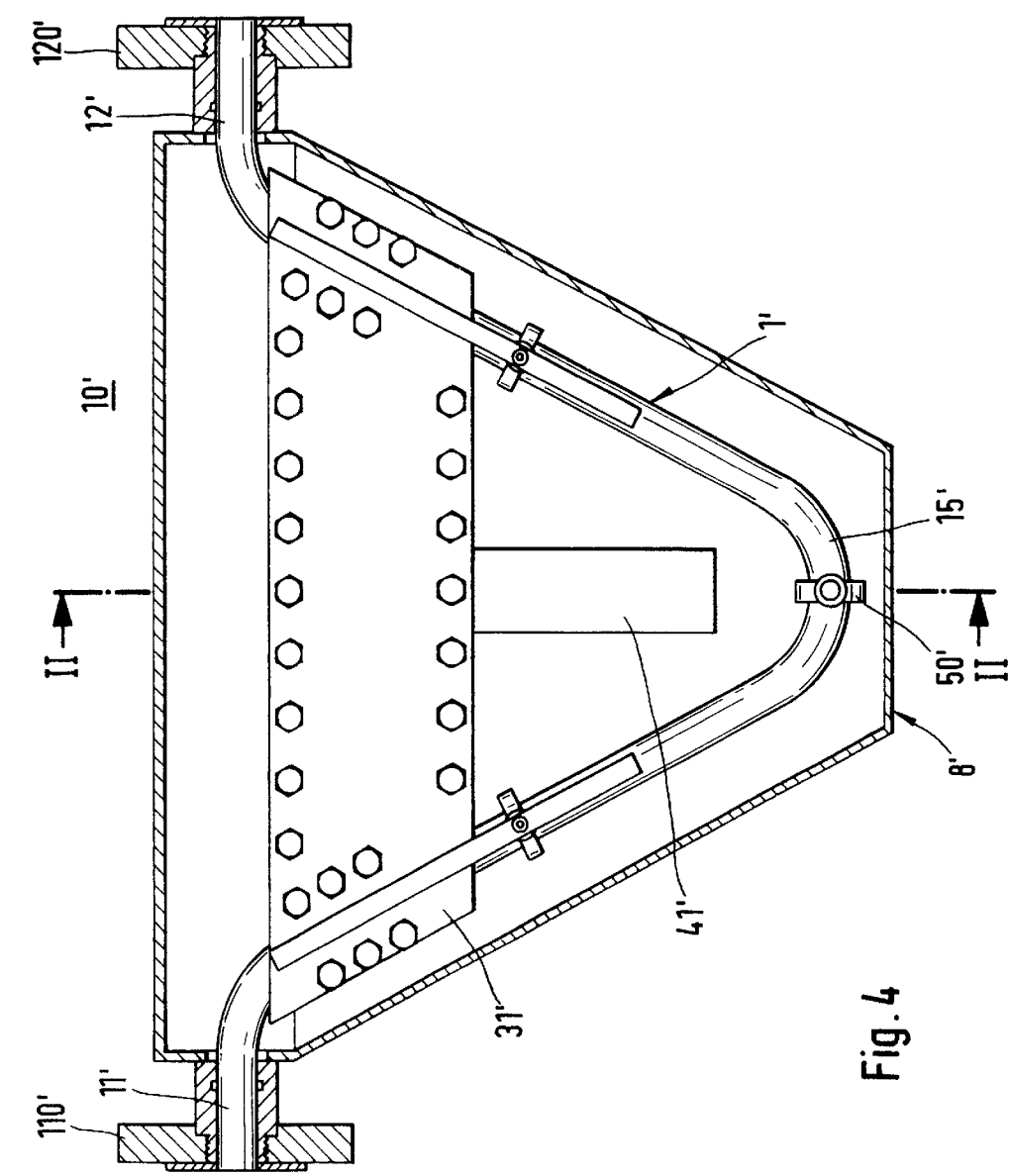

MASS FLOW RATE/DENSITY SENSOR WITH A SINGLE CURVED MEASURING TUBE

This Application claims the benefit of Provisional Application No. 60/201,893 filed May 4, 2000.

FIELD OF THE INVENTION

This invention relates to a mass flow rate/density sensor working on the Coriolis principle—hereinafter referred to as a Coriolis mass flow rate/density sensor—for measuring the mass flow rate and/or the density of a fluid which flows at least temporarily through a pipe; the Coriolis mass flow rate/density sensor is inserted into the pipe and mounted therein in a pressure-tight manner, for instance via flanges.

BACKGROUND AND SUMMARY OF THE INVENTION

WO-A 99/51946 corresponding to U.S. patent application Ser. No. 09/283,401 filed Apr. 1, 1999, particularly in connection with FIGS. 9 and 10, discloses a Coriolis mass flow rate sensor, which, of course, is also a density sensor, and which is designed to be installed in a pipe through which a fluid flows at least temporarily, with a single measuring tube bent in a plane with respect to an axis of symmetry and comprising:

a straight inlet section with an inlet axis lying in the plane;
a straight outlet section with an outlet axis lying in the plane and aligned with the inlet axis;
an inlet bend;
an outlet bend;
a vertex bend,
the inlet section being seamlessly connected with the inlet bend, and the outlet section being seamlessly connected with the outlet bend, and
the inlet bend merging seamlessly into the vertex bend, and the vertex bend merging seamlessly into the outlet bend,
  onto which inlet section a first and a second clamping body are clamped opposite each other to define a first limit of a measuring length forming a tube section of the measuring tube, and
  onto which outlet section a third and a fourth clamping body are clamped opposite each other to define a second limit of the measuring length,
  each of the clamping bodies having an internal surface, which rests against the measuring tube, and an external surface, which is remote from the internal surface and the measuring tube,
    said first and second clamping bodies having an inlet-side first sensor support fixed thereto, a longitudinal axis of which is parallel to the inlet axis, and
    said third and fourth clamping bodies having an outlet-side second sensor support fixed thereto, a longitudinal axis of which is parallel to the outlet axis,
  said vertex bend having a seismic exciter fixed thereto which excites the tube section in a third mode of vibration at an associated natural frequency $f_3$ which, if the tube section is filled with the fluid, lies between approximately 500 Hz and 1000 Hz,
  a first velocity or displacement sensor being fixed to the first sensor support and the inlet bend and a second velocity or displacement sensor being fixed to the second sensor support and the outlet bend at positions where, if the tube section is excited in the third mode of vibration, a deflection of the tube section caused by a disturbance originating from the pipe has a first and a second zero, respectively.

The design principle of this prior-art Coriolis mass flow rate sensor only permits vertex bends that have a large radius of curvature, or in other words, where the distance between the vertex and the inlet/outlet axis is only on the order of about 10 cm. For greater distances, particularly for distances greater by an order of magnitude than the order of 10 cm, the design principle disclosed in WO-A 99/51946 is unsuitable.

It is therefore an object of the invention to provide a Coriolis mass flow rate/density sensor which is based on the design principle described in the above prior art and in which the distance between the vertex of the vertex bend and the inlet/outlet axis can be practically arbitrarily great. At the same time, high measurement accuracy, e.g., an accuracy of the order of ±0.5%, is to be attainable.

To attain these objects, a first variant of the invention consists in a Coriolis mass flow rate/density sensor to be installed in a pipe through which a fluid flows at least temporarily, said Coriolis mass flow rate/density sensor comprising a single, V-shaped measuring tube bent in a plane with respect to an axis of symmetry and comprising:

a straight inlet section with an inlet axis lying in the plane;
a straight outlet section with an outlet axis lying in the plane and aligned with the inlet axis;
an inlet bend;
an outlet bend;
a vertex bend,
  the inlet section being seamlessly connected with the inlet bend, and the outlet section being seamlessly connected with the outlet bend;
a straight first tube section, which seamlessly connects the inlet bend with the vertex bend; and
a straight second tube section, which seamlessly connects the outlet bend with the vertex bend,
  onto which first tube section a first and a second clamping body are clamped opposite each other near the inlet bend to define a first limit of a measuring length forming a tube section of the measuring tube,
  onto which second tube section a third and a fourth clamping body are clamped opposite each other near the outlet bend to define a second limit of the measuring length,
  each of the clamping bodies having an internal surface, which rests against the measuring tube, and an external surface, which is remote from the internal surface and the measuring tube,
    which external surfaces of the first and third clamping bodies have a first flat body attached thereto, and
    which external surfaces of the second and fourth clamping bodies have a second flat body attached thereto,
      which two flat bodies are screwed together and to the clamping bodies, with a first spacing element interposed at a first long side and a second spacing element interposed at a second long side,
      which two flat bodies have an opposed-action body fixed thereto which extends along the axis of symmetry up to the vertex bend, where it supports a first portion of an exciter assembly, which has a principal axis and a second portion of which is fixed to the vertex bend, which exciter assembly excites the tube section in a third mode of vibration at an associated natural frequency $f_3$, to which first flat body are fixed an inlet-side first sensor support, a longitudinal axis of which is parallel to the first tube section, and an outlet-side second sensor support, a longitudinal axis of which is parallel to the second tube section, and to which second flat body are fixed an inlet-side first mount, a longitudinal axis of which is parallel to the first sensor support, and an outlet-side second mount, a longitudinal axis of which is parallel to the second sensor support, a first velocity or displacement sensor being fixed to the first tube section and the first sensor support and a second velocity or displacement sensor being fixed to the second tube section and the second sensor support at locations where, if the tube section is excited in the third mode of vibration, a deflection of the tube section caused by a disturbance originating from the pipe has a first and a second zero, respectively, and said inlet section and said outlet section being held by a supporting frame to which a housing is fixed which is attached to the mounts by means of a first spacer, lying opposite the first velocity or displacement sensor, and a second spacer, lying opposite the second velocity or displacement sensor, respectively.

To attain the above objects, a second variant of the invention consists in a Coriolis mass flow rate/density sensor to be installed in a pipe through which a fluid flows at least temporarily, said Coriolis mass flow rate/density sensor comprising a single, V-shaped measuring tube bent in a plane with respect to an axis of symmetry and comprising:

a straight inlet section with an inlet axis lying in the plane;

a straight outlet section with an outlet axis lying in the plane and aligned with the inlet axis;

an inlet bend;

an outlet bend;

a vertex bend, the inlet section being seamlessly connected with the inlet bend, and the outlet section being seamlessly connected with the outlet bend;

a straight first tube section, which seamlessly connects the inlet bend with the vertex bend; and a straight second tube section, which seamlessly connects the outlet bend with the vertex bend, onto which first tube section a first and a second clamping body are clamped opposite each other near the inlet bend to define a first limit of a measuring length forming a tube section of the measuring tube, onto which second tube section a third and a fourth clamping body are clamped opposite each other near the outlet bend to define a second limit of the measuring length, each of the clamping bodies having an internal surface, which rests against the measuring tube, and an external surface, which is remote from the internal surface and the measuring tube, which external surfaces of the first and third clamping bodies have a first flat body attached thereto, and which external surfaces of the second and fourth clamping bodies have a second flat body attached thereto, which two flat bodies are screwed together and to the clamping bodies with the interposition of a first spacing element at a first long side and of a second spacing element at a second long side, to which two flat bodies an opposed-action body is fixed which extends along the axis of symmetry toward, and ends before, the vertex bend, to which first flat body are fixed an inlet-side first sensor support, a longitudinal axis of which is parallel to the first tube section, and an outlet-side second sensor support, a longitudinal axis of which is parallel to the second tube section, and to which second flat body are fixed an inlet-side first mount, a longitudinal axis of which is parallel to the first sensor support, and an outlet-side second mount, a longitudinal axis of which is parallel to the second sensor support, which vertex bend has a seismic exciter fixed thereto which excites the tube section in a third mode of vibration at an associated natural frequency $f_3$, a first velocity or displacement sensor being fixed to the first tube section and the first sensor support, and a second velocity or displacement sensor being fixed to the second tube section and the second sensor support at locations where, if the tube section is excited in the third mode of vibration, a deflection of the tube section caused by a disturbance originating from the pipe has a first and a second zero, respectively, and said inlet section and said outlet section being held by a supporting frame to which a housing is fixed which is attached to the mounts by means of a first spacer, lying opposite the first velocity or displacement sensor, and a second spacer, lying opposite the second velocity or displacement sensor, respectively.

According to a first development of the two variants of the invention, a first added material is fixed to the first tube section near the vertex bend approximately where a node of the third mode of vibration occurs, and a second added material is fixed to the second tube section symmetrically with respect to the axis of symmetry.

In a first preferred embodiment of the invention and/or of its first development, the exciter assembly is fixed to the vertex bend and the opposed-action body in such a way that the principal axis of the exciter assembly extends in the direction of a vertex bend diameter vertical to the axis of symmetry.

In a second preferred embodiment of the invention and/or of its first development, the exciter assembly is fixed to the vertex bend and the opposed-action body in such a way that a principal axis of the exciter assembly extends parallel to a vertex bend diameter vertical to the axis of symmetry and lies between the vertex bend and the housing.

According to a second development of the two variants of the invention, a compensation body, a longitudinal axis of which is perpendicular to the axis of symmetry and which serves to dynamically balance a Coriolis mode belonging to the third mode of vibration, is fixed to the opposed-action body near the flat bodies.

According to a third development of the two variants of the invention, the two flat bodies and the first spacing element are provided with a first recess along the axis of symmetry, and the two flat bodies, the second spacing element, and the opposed-action body are provided with a second recess along the access of symmetry, leaving respective torsion portions.

In a preferred embodiment of the third development of the invention, the torsion portions are designed as a common swivel joint.

In a preferred embodiment of the two variants of the invention as well as of their developments, the first, second, third, and fourth clamping bodies have the same mass.

In another preferred embodiment of the two variants of the invention as well as of their developments, the housing is composed of flat metal sheets and comprises:

a front sheet with a first middle plane;

a rear sheet with a second middle plane;

a vertex sheet with a third middle plane;

a first side sheet with a fourth middle plane; and a second side sheet with a fifth middle plane, with
  the first middle plane being parallel to the first tube section,
  the second middle plane being parallel to the second tube section,
  the third middle plane being perpendicular to the plane,
  the fourth and fifth middle planes being parallel to the flat bodies, and
  the rear sheet being fastened via the spacers to the mounts.

One advantage of the invention is that it allows the construction of Coriolis mass flow rate/density sensors whose overall length, i.e., the length along the inlet/outlet axis, is considerably less than the overall length of the prior-art arrangement disclosed in WO-A 99/51946. This is due to, among other things, the V-shape of the measuring tube. A compact sensor with the desired measurement accuracy is thus obtained.

Another advantage accrues because an effect that is possible with the prior-art arrangement does not occur. This effect consists in the fact that, because of the clamping bodies being mechanically interconnected only via the measuring tube, but otherwise being independent, the measuring tube can be excited by vibrations originating from the pipe into vibrations that have a lower frequency than the frequency of the third mode. These low-frequency vibrations, like the vibrations of the third mode, are converted by the sensors into electric signals and are contained in the latter as interfering signals. In the arrangement according to the invention, the clamping bodies on the inlet side are substantially rigidly connected with those on the outlet side via, among other things, the flat bodies, so that the excitation of the low-frequency vibrations is practically impossible.

BRIEF DESCRIPTION OF THE DRAWINGS

The invention will become more apparent by reference to the following description of embodiments taken in conjunction with the accompanying drawings, in which corresponding parts are designated by the same reference numerals throughout the various figures, but such reference numerals are repeated only if this appears appropriate, and in which:

FIG. 1 is a partially sectioned longitudinal view of a Coriolis mass flow rate/density sensor according to the first variant of the invention;

FIG. 2 is a partially sectioned side view taken along line I—I of FIG. 1;

FIG. 4 is a partially sectioned longitudinal view of a Coriolis mass flow rate/density sensor according to the second variant of the invention;

FIG. 5 is a partically sectioned side view taken along line Il—Il of FIG. 4.

DETAILED DESCRIPTION OF EXEMPLARY EMBODIMENTS

Figure 3:
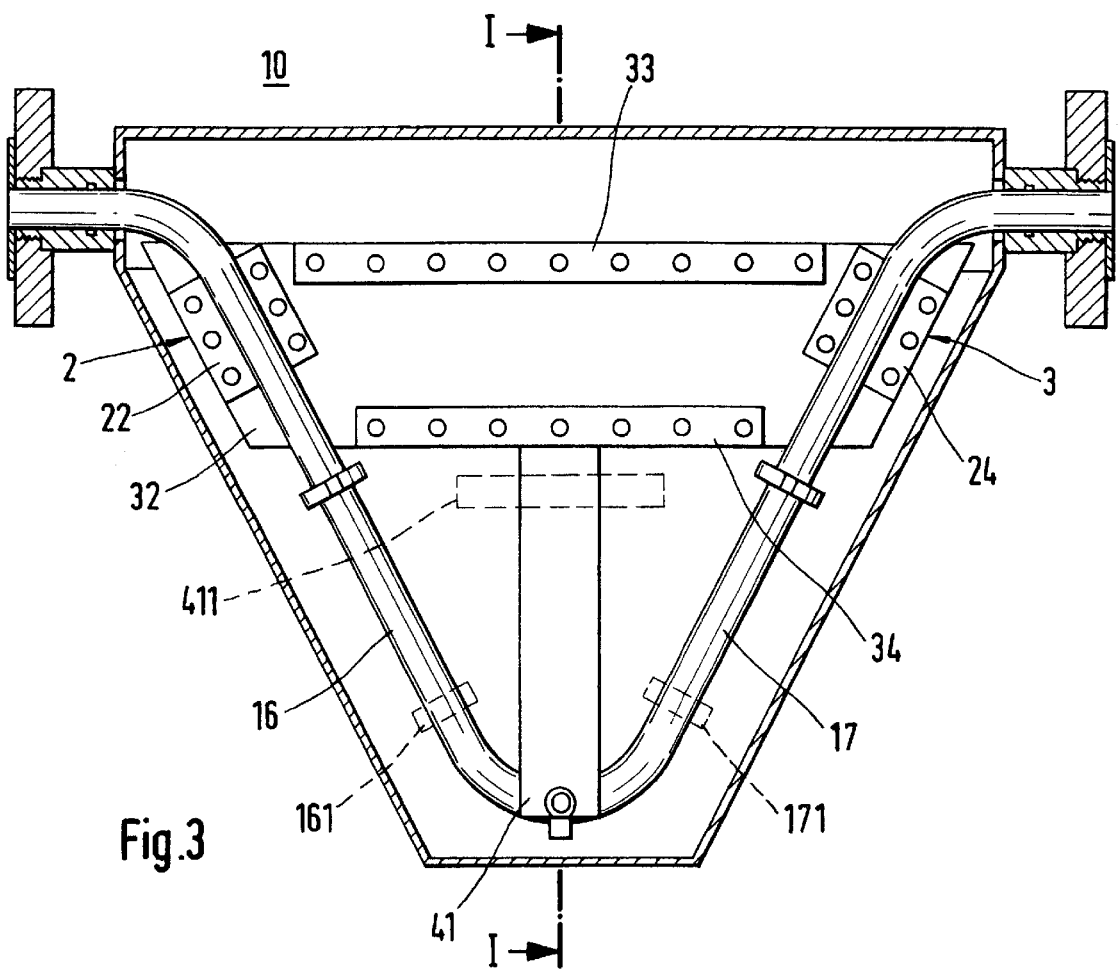
FIG. 3 is another partially sectioned longitudinal view of the Coriolis mass flow rate/density sensor of FIG. 1 in which some parts of FIG. 1 are not shown.

While the invention is susceptible to various modifications and alternative forms, exemplary embodiments thereof have been shown by way of example in the drawings and will herein be described in detail. It should be understood, however, that there is no intent to limit the invention to the particular forms desclosed, but on the contrary, the invention is to cover all modifications, equivalents, and alternatives falling within the spirit and scope of the invention as defined by the appended claims.

FIGS. 1 and 3 show partially sectioned longitudinal views of an embodiment of a Coriolis mass flow rate/density sensor 10 according to the first variant of the invention. In FIG. 1, parts of the below-mentioned housing have been omitted, so that the internal structure of the Coriolis mass flow rate/density sensor 10 is visible. In FIG. 3, some components of this internal structure of FIG. 1 have been omitted, so that components covered by those components in FIG. 1 are visible. FIG. 2 is a partially sectioned side view of FIG. 1, the section being taken along line I—I of FIG. 1. FIGS. 1 to 3 will now be explained together and should be viewed together.

Coriolis mass flow rate/density sensor 10 comprises a single measuring tube 1 which is bent in a plane—in FIG. 1, this is the plane of the paper—to a V-shape with respect to an axis of symmetry I—I, which is also the line along which the section of FIG. 2 is taken. Measuring tube 1 has a straight inlet section 11, which has an inlet axis lying in the plane. Furthermore, measuring tube 1 has a straight outlet section 12, which has an outlet axis lying in the plane and aligned with the inlet axis. Coriolis mass flow rate/density sensor 10 can thus be installed in a straight pipe.

Measuring tube 1 further has an inlet bend 13, an outlet bend 14, and a vertex bend 15. Inlet section 11 and outlet section 12 are seamlessly connected with inlet bend 13 and outlet bend 14, respectively.

Measuring tube 1 further comprises a straight first tube section 16 and a straight second tube section 17. Tube section 16 connects inlet bend 13 seamlessly with vertex bend 15, and tube section 17 connects outlet bend 14 seamlessly with vertex bend 15, so that measuring tube 1 is formed as a single piece and can be bent from a straight tube length in a suitable bending machine. Since measuring tube 1 is bent to a V-shape, i.e., since measuring tube 1 is not straight, measuring tube 1 can advantageously be made of steel, preferably of high-quality steel.

In the embodiments shown, inlet section 11 ends in a first flange 110, and outlet section 12 ends in a second flange 120. As mentioned at the beginning, Coriolis mass flow rate/density sensor 10 is inserted into the pipe and mounted therein in a pressure-tight manner via flanges 110, 120.

A sleeve 111, which surrounds inlet section 11, ends in an internal surface of flange 110. The sleeve 111 serves to reinforce inlet section 11 and is, for instance, pressufitted thereon, with a seal ring 112 interposed between inlet section 11 and sleeve 111.

In a similar manner, a sleeve 121, which surrounds outlet section 12, ends in an internal surface of flange 120. The sleeve 121 serves to reinforce outlet section 12 and is, for instance, press-fitted thereon, with a seal ring 122 interposed between outlet section 12 and sleeve 121.

Onto tube section 16, a first and a second clamping body have been clamped opposite each other near inlet bend 13; in FIG. 2, they cannot be seen because the first and a second clamping body are covered, while in FIG. 3, only the second clamping body 22 is visible. These two clamping bodies form a first pair 2 of clamping bodies and define a first limit of a measuring length forming a tube section of measuring tube 1.

Onto tube section 17, a third and a fourth clamping body 23, 24 have been clamped opposite each other near outlet bend 14; in FIG. 2, both clamping bodies 23, 24 can be seen, while in FIG. 3, only the fourth clamping body 24 is visible. These two clamping bodies 23, 24 form a second pair 3 of clamping bodies and define a second limit of the measuring length forming the tube section of measuring tube 1. The four clamping bodies preferably have the same mass.

In FIG. 3, the measuring length thus extends from the lower edge of the first pair 2 of clamping bodies to the lower edge of the second pair 3 of clamping bodies; these pairs 2, 3 delimit that tube section which is set into vibration during operation and on which Coriolis forces act when a fluid is flowing the rethrough.

Each clamping body has an internal surface, which rests against measuring tube 1 and which may be adapted to the shape of the outer wall of the measuring tube 1, and an external surface, which is remote from the internal surface and from measuring tube 1, and which is preferably plane. A first flat body 31 is attached to the external surface of the first clamping body and the third clamping body 23, and a second flat body 32 is attached to the external surfaces of the second and fourth clamping bodies 22, 24.

The two flat bodies 31, 32 are fastened together and to the clamping bodies, with a first spacing element 33 interposed at a first long side and a second spacing element 34 interposed at a second long side. This is done by fasteners such as the screws shown in the figures, one of which is designated 311.

The thickness of spacing elements 33, 34 and the thickness of the pairs 2, 3 of clamping bodies with measuring tube 1 clamped therebetween are adapted to one another so that the two flat bodies are fastened together virtually torsion-free. Furthermore, the thickness of the clamping bodies of each pair 2, 3 of clamping bodies is adapted to the outside diameter of measuring tube 1 such that the associated clamping bodies clamp measuring tube 1 in place and that with the internal surfaces of the clamping bodies resting against the outer wall of the measuring tube 1.

An opposed-action body 41 is fixed to the two flat bodies 31, 32, which extends along, and preferably symmetrically with respect to, the axis of symmetry I—I up to vertex bend 15, where the opposed-action body 41 supports a first portion 51 of an exciter assembly 50, which has a principal axis 53, and a second portion 52 of which is fixed to vertex bend 15. The first portion 51 is, for example, a permanent magnet or a coil, and the second portion 52 is, for example, a coil or a permanent magnet, respectively, of an electrodynamic shaker.

In a preferred embodiment of the first variant of the invention, exciter assembly 50 is fixed to vertex bend 15 and to opposed-action body 41 in such a way that the principal axis 53 of the exciter assembly 50 extends in the direction of the diameter of vertex bend 15, which diameter is vertical to the symmetry line I—I, as shown in FIGS. 1 to 3.

In another preferred embodiment of the first variant of the invention, the exciter assembly 50 is fixed to the vertex bend 15 and the opposed-action body 41 in such a way that the principal axis 53 of the exciter assembly 50 is parallel to a diameter of the vertex bend 15 and lies between the vertex bend 15 and the housing 8 (see below); this is not shown for the sake of clarity. This arrangement improves the efficiency of the exciter assembly 50; for example, an improvement by about 25% may be obtained if the principal axis 53 of the exciter assembly 50 is shifted by about one diameter of the measuring tube 1 with respect to the position shown in FIGS. 1 to 3.

Exciter assembly 50 excites the tube section, and thus the measuring length, in a third mode of vibration at an associated natural frequency $f_3$. If the tube section is filled with the fluid, this natural frequency generally lies between about 500 Hz and 1000 Hz.

The third mode is that vibration of the tube section at which only two nodes and three antinodes occur simultaneously between the pairs 2, 3 of clamping bodies, one of three antinodes at vertex bend 15; the third mode has the associated natural frequency $f_3$ and is comparable to the second overtone of a vibrating string.

By contrast, the second mode is that vibration of the tube section at which only a single node, namely at vertex bend 15, and two antinodes occur simultaneously between the pairs 2, 3 of clamping bodies. The second mode has a natural frequency $f_2$ and is comparable to the first overtone of a string.

In the invention, the natural frequency $f_3$ of the third mode has approximately five times the value of the frequency of the first mode, which is the fundamental mode with a natural frequency $f_1$. The fundamental mode has a single antinode at vertex bend 15 and no node between the pairs 2, 3 of clamping bodies.

In addition to the third mode excited at its natural frequency $f_3$ in accordance with the invention, when a fluid is flowing, the aforementioned second mode and a corresponding fourth mode with a natural frequency $f_4$ result; these two modes may be referred to as Coriolis modes. In the invention, the natural frequencies $f_2$, $f_4$ have approximately the following numerical values:

$$f_2 \approx 0.6 f_3; \quad f_4 \approx 1.7 f_3$$

Signals with the two natural frequencies $f_2$, $f_4$ are generally not be picked up individually by the sensors explained below, since the sensors 71, 72 generate signals that have exclusively the natural frequency $f_3$ of the third mode, at which measuring tube 1 vibrates exclusively, but the two Coriolis modes are responsible for a phase shift between the sensor signals, which is a measure of the mass flow rate of the fluid through the measuring tube 1.

Opposed-action body 41 serves to balance the third mode of measuring tube 1; the opposed-action body 41 and measuring tube 1 thus vibrate at virtually the same frequency, but in opposite phase.

Attached to flat body 31 are an inlet-side first sensor support 61, a longitudinal axis of which is parallel to tube section 16, and an outlet-side second sensor support 62, a longitudinal axis of which is parallel to tube section 17.

Fixed to flat body 32 are an inlet-side first mount, a longitudinal axis of which is parallel to sensor support 61, and an outlet-side second mount 64, a longitudinal axis of which is parallel to sensor support 62. The first mount is not visible in FIGS. 1 to 3 as the first mount is preferably covered, but the first mount is mirror-symmetric with respect to the axis of symmetry I—I and can thus be readily imagined as the mirror image of mount 64.

A first speed or displacement sensor 71 is fixed to tube section 16 and sensor support 61, and a second speed or displacement sensor 72 is fixed to tube section 17 and sensor support 62, at locations where, if the tube section is excited in the third mode of vibration, a deflection of the tube section caused by a disturbance originating from the pipe has a first and a second zero, respectively.

The positions of these zeros on tube sections 16, 17 can be easily determined empirically: As exciter assembly 50 is fixed at the vertex of vertex bend 15, and thus in the middle of the measuring length, the zeros are located at the same distance from the pairs 2, 3 of clamping bodies; in the case of a homogeneous measuring tube, this distance is approximately equal to 0.21 times the measuring length. The respective locations of the zeros are not correlated with the respective locations of the nodes of the third mode, i.e., these locations are independent of each other.

Sensors 71, 72 are generally implemented with speed or displacement sensors. A speed sensor generates a sinusoidal signal whose phase shift with respect to the sinusoidal motion of the measuring length caused by exciter assembly 50 is 90°. A displacement sensor generates a sinusoidal signal whose phase shift with respect to the sinusoidal motion of the measuring length caused by exciter 50 is zero.

Inlet section 11 and outlet section 12 are held by a supporting frame 35; in the embodiments shown, this is accomplished exclusively via sleeves 111, 121, which are welded or brazed to supporting frame 35, i.e., supporting frame 35 is not in contact with inlet section 11 and outlet section 12.

Joined to supporting frame 35, for example by welding or brazing, is a housing 8, which is fixed to the first mount via a first spacer, which is located opposite the first sensor 71. Furthermore, housing 8 is fixed to mount 64 via a second spacer 92, which is located opposite the second sensor 72.

The first spacer cannot be seen in FIGS. 1 to 3 as the first spacer is covered, but the first spacer is preferably mirror-symmetric with respect to the axis of symmetry I—I and can thus be readily imagined as the mirror image of spacer 92.

In a preferred embodiment of the invention, housing 8 is composed of flat metal sheets, which are preferably welded or brazed together. Housing 8 comprises a front sheet 81 with a first middle plane, a rear sheet 82 with a second middle plane, a vertex sheet 85 with a third middle plane, a first side sheet 83 with a fourth middle plane, and a second side sheet 84 with a fifth middle plane.

The first middle plane is parallel to tube section 16, and the second middle plane is parallel to section 17. The third middle plane is perpendicular to the above-mentioned plane in which measuring tube 1 is bent. The fourth and fifth middle planes are parallel to flat bodies 31, 32, and rear sheet 82 is fastened to the mounts via the spacers.

In FIG. 3, a development of the first variant of the invention is shown by dashed lines. On the first tube section 16, a first added material 161 is fixed near vertex bend 15 approximately at a point where during operation a node of the third mode of vibration occurs, and on the second tube section 17, a second added material 171 is fixed symmetrically with respect to the axis of symmetry I—I. The locations of the nodes can be easily determined empirically or by way of calculation, with an exact placement of the added materials being not important.

Through the added materials 161, 171, the locations of the aforementioned nodes are slightly shifted along measuring tube 1 when compared with an arrangement without added materials. With the added materials 161, 171, a substantial improvement in the efficiency of exciter assembly 50 can be achieved in comparison with an arrangement without added materials. As measurements have shown, this improvement may be up to 50%.

The efficiency of the exciter assembly 50 can be further increased if in addition to added materials 161, 171, the above-mentioned preferred arrangement of the exciter assembly 50 is used in which the exciter assembly 50 is fixed to the vertex bend and the opposed-action body in such a way that the principal axis 53 of the exciter assembly 50 is parallel to a diameter of the vertex bend 15.

FIG. 4 is a partially sectioned longitudinal view of a Coriolis mass flow rate/density sensor 10' according to the second variant of the invention, and FIG. 5 is a partial section taken along line Il—Il of FIG. 4. Regarding the visibility of the components, FIGS. 4 and 5 correspond to FIGS. 1 and 2, respectively. In FIGS. 4 and 5, similar reference numerals have been used to designate parts corresponding to those of FIGS. 1 to 3, but these reference numerals have been provided with a prime.

The second variant of the invention differs from the first variant in that opposed-action body 41' does not extend up to vertex bend 15', but ends before reaching the vertex bend 15'.

Therefore, in the second variant of the invention, a seismic exciter 50' as described in detail in the above-mentioned PCT publication WO-A 99/51946 is used in place of exciter assembly 50 of FIGS. 1 to 3.

The length of opposed-action body 41, 41' projecting beyond the fixing point at the flat bodies 31, 32 in FIGS. 1 to 3 and at the corresponding flat bodies 31', 32' in FIGS. 4 and 5, the three-dimensional shape of opposed-action body 41, 41', and the mass of opposed-action body 41, 41' depend on the dimensions of Coriolis mass flow rate/density sensor 10, 10', particularly on the nominal bore of measuring tube 1, 1', on the wall thickness and, thus, the mass of the measuring tube 1, 1', and on the masses of the clamping bodies, spacing elements, and flat bodies.

The length, three-dimensional shape, and mass of opposed-action body 41, 41' are determined for each desired nominal bore of the Coriolis mass flow rate/density sensor 10, 10' based on the criterion that in operation, i.e., with measuring tube 1, 1' vibrating, ideally no vibrations occur at inlet section 11, lit and/or at flange 110, 110' and at outlet section 12, 12' and/or flange 120, 120'.

This freedom from vibration can be determined, e.g., empirically, by mounting acceleration sensors in the respective flange area. A more elegant method, however, is to dimension the opposed-action body 41, 41' using a finite element program.

In FIG. 3, a further development of the invention is shown by dashed lines, which can be used in both variants of the invention. Near flat bodies 31, 32, a compensation body 411 is fixed to opposed-action body 41. A longitudinal axis of compensation body 411 is perpendicular to the axis of symmetry I—I. Compensation body 411 serves to dynamically balance the above-mentioned Coriolis mode of frequency $f_c$ belonging to the third mode of vibration, and vibrates at this frequency 180° out of phase with opposed-action body 41. The dimensions, the three-dimensional shape, and the mass of the compensation body 411 can again be determined empirically or using a finite element program.

Figure 6:
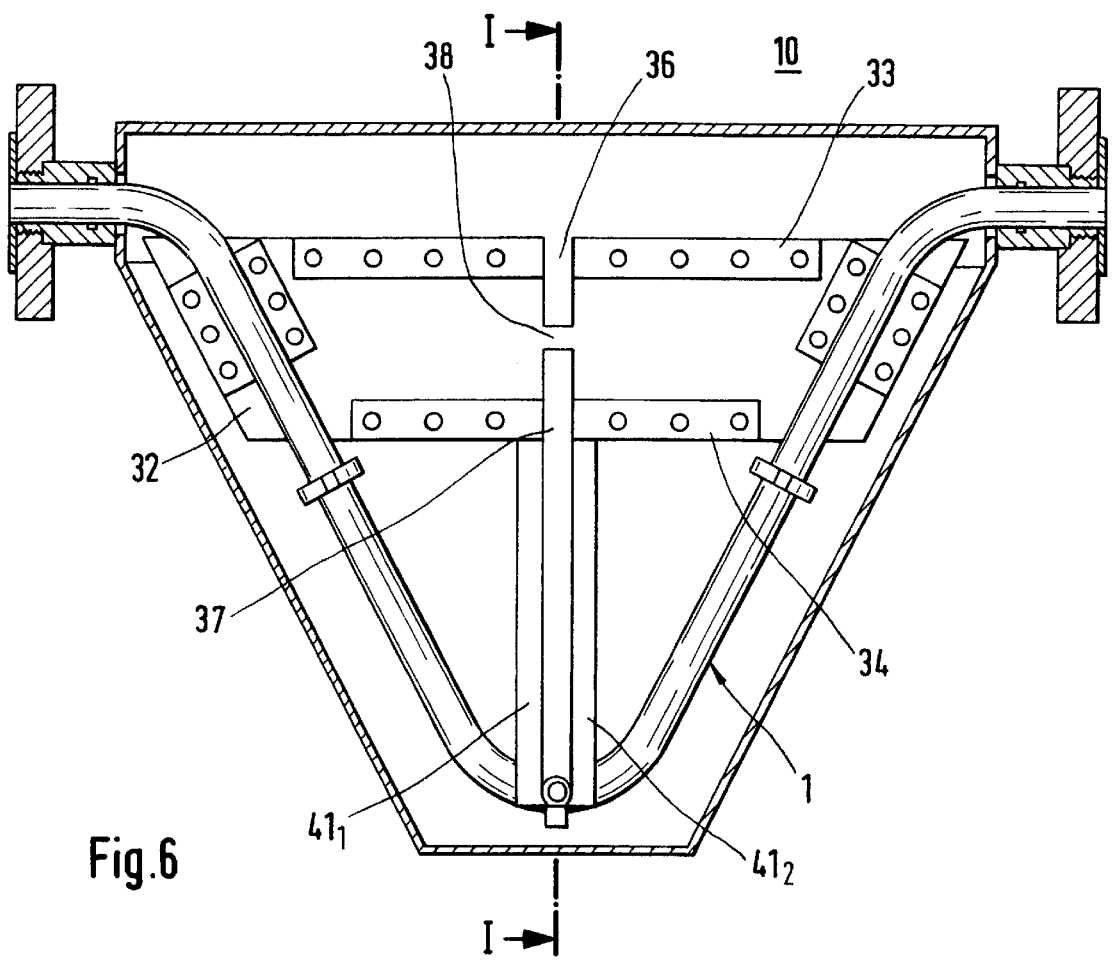
FIG. 6 shows, in a similar manner to FIG. 3, a partially sectioned longitudinal view of a further development of the two variants of the invention.

FIG. 6 shows, in a manner similar to FIG. 3, a partially sectioned longitudinal view of a further development of the two variants of the invention. The two flat bodies, of which only flat body 32 can be seen in FIG. 6, and spacing element 33 are provided with a first recess 36 along the axis of symmetry I—I.

Furthermore, the two flat bodies, spacing element 34, and the opposed-action body are provided with a second recess 37 along the axis of symmetry I—I. Recesses 36, 37 extend toward each other only to the point that in each flat body, a torsion portion is left, of which the torsion torsion 38 can be seen in FIG. 6. Preferably, the two portion portions are designed as a swivel joint. As the recess 37 also extends through the opposed-action body, the latter is divided into two parts 41*k,* 412.

The development of FIG. 6 again serves to dynamically balance the Coriolis mode, since the torsion portions permit those portions of the flat bodies which are on the left-hand side in FIG. 6 to move back and fourth with respect to the right-hand portions 180 out of phase with the Coriolis mode of measuring tube 1.

The exciter circuit for feeding seismic exciter 50' or exciter assembly 50 and the measuring-channel circuit for processing the voltages provided by the sensors 71, 72 into a mass flow rate and density signal do not form part of the invention and, therefore, are not described here. Use can be made of the circuits that have been employed for those purposes and have been familiar to those skilled in the art for a long time.

While the invention has been illustrated and described in detail in the drawing and foregoing description, such illustration and description is to be considered as exemplary and not restrictive in character, it beeing understood that only exemplary embodiments have been shown and described and that all changes and modifications that come within the spirit of the invention are desired to be protected.

What is claimed is:

1. A Coriolis mass flow rate/density sensor to be installed in a pipe through which a fluid flows at least temporarily, said Coriolis mass flow rate/density sensor comprising a single, V-shaped measuring tube bent in a plane with respect to an axis of symmetry and comprising:
    a straight inlet section with an inlet axis lying in the plane;
    a straight outlet section with an outlet axis lying in the plane and aligned with the inlet axis;
    an inlet bend;
    an outlet bend;
    a vertex bend,
        the inlet section being seamlessly connected with the inlet bend, and the outlet section being seamlessly connected with the outlet bend;
    a straight first tube section, which seamlessly connects the inlet bend with the vertex bend; and
    a straight second tube section, which seamlessly connects the outlet bend with the vertex bend,
        onto which first tube section a first and a second clamping body are clamped opposite each other near the inlet bend to define a first limit of a measuring length forming a tube section of the measuring tube,
        onto which second tube section a third and a fourth clamping body are clamped opposite each other near the outlet bend to define a second limit of the measuring length,
    each of the clamping bodies having an internal surface, which rests against the measuring tube, and an external surface, which is remote from the internal surface and the measuring tube,
        which external surfaces of the first and third clamping bodies have a first flat body attached thereto, and
        which external surfaces of the second and fourth clamping bodies have a second flat body attached thereto,
            which two flat bodies are screwed together and to the clamping bodies, with a first spacing element interposed at a first long side and a second spacing element interposed at a second long side,
            which two flat bodies have an opposed-action body fixed thereto which extends along the axis of symmetry up to the vertex bend, where it supports a first portion of an exciter assembly, which has a principal axis and a second portion of which is fixed to the vertex bend,
            which exciter assembly excites the tube section in a third mode of vibration at an associated natural frequency $f_3$,
            to which first flat body are fixed an inlet-side first sensor support, a longitudinal axis of which is parallel to the first tube section, and an outlet-side second sensor support, a longitudinal axis of which is parallel to the second tube section, and
            to which second flat body are fixed an inlet-side first mount, a longitudinal axis of which is parallel to the first sensor support, and an outlet-side second mount, a longitudinal axis of which is parallel to the second sensor support,
    a first velocity or displacement sensor being fixed to the first tube section and the first sensor support and a second velocity or displacement sensor being fixed to the second tube section and the second sensor support at locations where, if the tube section is excited in the third mode of vibration, a deflection of the tube section caused by a disturbance originating from the pipe has a first and a second zero, respectively, and
    said inlet section and said outlet section being held by a supporting frame
        to which a housing is fixed which is attached to the mounts by means of a first spacer, lying opposite the first velocity or displacement sensor, and a second spacer, lying opposite the second velocity or displacement sensor, respectively.

2. The Coriolis mass flow rate/density sensor as claimed in claim 1 wherein a first added material is fixed to the first tube section near the vertex bend approximately where a node of the third mode of vibration occurs, and a second added material is fixed to the second tube section symmetrically with respect to the axis of symmetry.

3. The Coriolis mass flow rate/density sensor as claimed in claim 1 wherein the exciter assembly is fixed to the vertex bend and the opposed-action body in such a way that the principal axis of the exciter assembly extends in the direction of a vertex bend diameter vertical to the axis of symmetry.

4. The Coriolis mass flow rate/density sensor as claimed in claim 1 wherein the exciter assembly is fixed to the vertex bend and the opposed-action body in such a way that a principal axis of the exciter assembly extends parallel to a vertex bend diameter vertical to the axis of symmetry and lies between the vertex bend and the housing.

5. The Coriolis mass flow rate/density sensor as claimed in claim 1 wherein a compensation body, a longitudinal axis of which is perpendicular to the axis of symmetry and which serves to dynamically balance a Coriolis mode belonging to the third mode of vibration, is fixed to the opposed-action body near the flat bodies.

6. The Coriolis mass flow rate/density sensor as claimed in claim 1 wherein the two flat bodies and the first spacing element are provided with a first recess along the axis of symmetry, and the two flat bodies, the second spacing element, and the opposed-action body are provided with a second recess along the access of symmetry, leaving respective torsion portions.

7. The Coriolis mass flow rate/density sensor as claimed in claim 1 wherein the torsion portions are designed as a common swivel joint.

8. The Coriolis mass flow rate/density sensor as claimed in claim 1 wherein the first, second, third, and fourth clamping bodies have the same mass.

9. The Coriolis mass flow rate/density sensor as claimed in claim 1 wherein the housing is composed of flat metal sheets and comprises:

a front sheet with a first middle plane;

a rear sheet with a second middle plane;

a vertex sheet with a third middle plane;

a first side sheet with a fourth middle plane; and a second side sheet with a fifth middle plane, with
the first middle plane being parallel to the first tube section,
the second middle plane being parallel to the second tube section,
the third middle plane being perpendicular to the plane,
the fourth and fifth middle planes being parallel to the flat bodies, and
the rear sheet being fastened via the spacers to the mounts.

10. A Coriolis mass flow rate/density sensor to be installed in a pipe through which a fluid flows at least temporarily, said Coriolis mass flow rate/density sensor comprising a single, V-shaped measuring tube bent in a plane with respect to an axis of symmetry and comprising:

a straight inlet section with an inlet axis lying in the plane;

a straight outlet section with an outlet axis lying in the plane and aligned with the inlet axis;

an inlet bend;

an outlet bend;

a vertex bend,
the inlet section being seamlessly connected with the inlet bend, and the outlet section being seamlessly connected with the outlet bend;

a straight first tube section, which seamlessly connects the inlet bend with the vertex bend; and a straight second tube section, which seamlessly connects the outlet bend with the vertex bend,
onto which first tube section a first and a second clamping body are clamped opposite each other near the inlet bend to define a first limit of a measuring length forming a tube section of the measuring tube,
onto which second tube section a third and a fourth clamping body are clamped opposite each other near the outlet bend to define a second limit of the measuring length,
each of the clamping bodies having an internal surface, which rests against the measuring tube, and an external surface, which is remote from the internal surface and the measuring tube,
which external surfaces of the first and third clamping bodies have a first flat body attached thereto, and
which external surfaces of the second and fourth clamping bodies have a second flat body attached thereto,
which two flat bodies are screwed together and to the clamping bodies with the interposition of a first spacing element at a first long side and of a second spacing element at a second long side,
to which two flat bodies an opposed-action body is fixed which extends along the axis of symmetry toward, and ends before, the vertex bend,
to which first flat body are fixed an inlet-side first sensor support, a longitudinal axis of which is parallel to the first tube section, and an outlet-side second sensor support, a longitudinal axis of which is parallel to the second tube section, and to which second flat body are fixed an inlet-side first mount, a longitudinal axis of which is parallel to the first sensor support, and an outlet-side second mount, a longitudinal axis of which is parallel to the second sensor support,
which vertex bend has a seismic exciter fixed thereto which excites the tube section in a third mode of vibration at an associated natural frequency $f_3$,
a first velocity or displacement sensor being fixed to the first tube section and the first sensor support, and a second velocity or displacement sensor being fixed to the second tube section and the second sensor support at locations where, if the tube section is excited in the third mode of vibration, a deflection of the tube section caused by a disturbance originating from the pipe has a first and a second zero, respectively, and
said inlet section and said outlet section being held by a supporting frame
to which a housing is fixed which is attached to the mounts by means of a first spacer, lying opposite the first velocity or displacement sensor, and a second spacer, lying opposite the second velocity or displacement sensor, respectively.

11. The Coriolis mass flow rate/density sensor as claimed in claim 10 wherein a first added material is fixed to the first tube section near the vertex bend approximately where a node of the third mode of vibration occurs, and a second added material is fixed to the second tube section symmetrically with respect to the axis of symmetry.

12. The Coriolis mass flow rate/density sensor as claimed in claim 10 wherein a compensation body, a longitudinal axis of which is perpendicular to the axis of symmetry and which serves to dynamically balance a Coriolis mode belonging to the third mode of vibration, is fixed to the opposed-action body near the flat bodies.

13. The Coriolis mass flow rate/density sensor as claimed in claim 10 wherein the two flat bodies and the first spacing element are provided with a first recess along the axis of symmetry, and the two flat bodies, the second spacing element, and the opposed-action body are provided with a second recess along the access of symmetry, leaving respective torsion portions.

14. The Coriolis mass flow rate/density sensor as claimed in claim 13 wherein the torsion portions are designed as a common swivel joint.

15. The Coriolis mass flow rate/density sensor as claimed in claim 10 wherein the first, second, third, and fourth clamping bodies have the same mass.

16. The Coriolis mass flow rate/density sensor as claimed in claim 10 wherein the housing is composed of flat metal sheets and comprises:
- a front sheet with a first middle plane;
- a rear sheet with a second middle plane;
- a vertex sheet with a third middle plane;
- a first side sheet with a fourth middle plane; and
- a second side sheet with a fifth middle plane, with
- the first middle plane being parallel to the first tube section,
- the second middle plane being parallel to the second tube section,
- the third middle plane being perpendicular to the plane,
- the fourth and fifth middle planes being parallel to the flat bodies, and
- the rear sheet being fastened via the spacers to the mounts.

* * * * *

UNITED STATES PATENT AND TRADEMARK OFFICE
CERTIFICATE OF CORRECTION

PATENT NO.    : 6,484,591 B2
DATED         : November 26, 2002
INVENTOR(S)   : Wolfgang Drahm et al.

It is certified that error appears in the above-identified patent and that said Letters Patent is hereby corrected as shown below:

<u>Title page,</u>
Please add the following Assignee: -- [73] Assignee: Endress + Hauser Flowtec AG --

Signed and Sealed this

Fourteenth Day of October, 2003

JAMES E. ROGAN
*Director of the United States Patent and Trademark Office*